Oct. 28, 1930.  T. CARROLL  1,779,801
AIRPLANE LANDING GEAR
Filed Feb. 18, 1928   2 Sheets-Sheet 2

INVENTOR
Thomas Carroll
By Robert H. Young
ATTORNEY

Patented Oct. 28, 1930

1,779,801

UNITED STATES PATENT OFFICE

THOMAS CARROLL, OF HAMPTON, VIRGINIA

AIRPLANE LANDING GEAR

Application filed February 18, 1928. Serial No. 255,312.

This invention relates to aeronautics, but more particularly to landing gears for airplanes, and has for its object to provide a device of this class for amphibious aircraft capable of taking off or landing from either land or water.

A further object of the invention is to provide a landing gear for such aircraft in which the act of raising the landing wheels, automatically locates the floats in operative position, and in which the act of raising the floats automatically locates the landing wheels in operative position.

A further object of the invention is to provide a landing gear for such aircraft in which the selective positioning of the wheels or floats can be instantly accomplished while the aircraft is in flight or in the water.

A further object of the invention is to provide a landing gear for such aircraft which is of light weight, simple and inexpensive to construct and attach, and which is strong, durable and efficient.

With these and other objects in view, the invention consists of the novel coordination of the landing wheels and floats; in the novel means for selectively positioning the same, and in certain novel details of construction and combination of parts, all of which will be first fully described and afterwards specifically pointed out in the appended claims.

Figure 1:
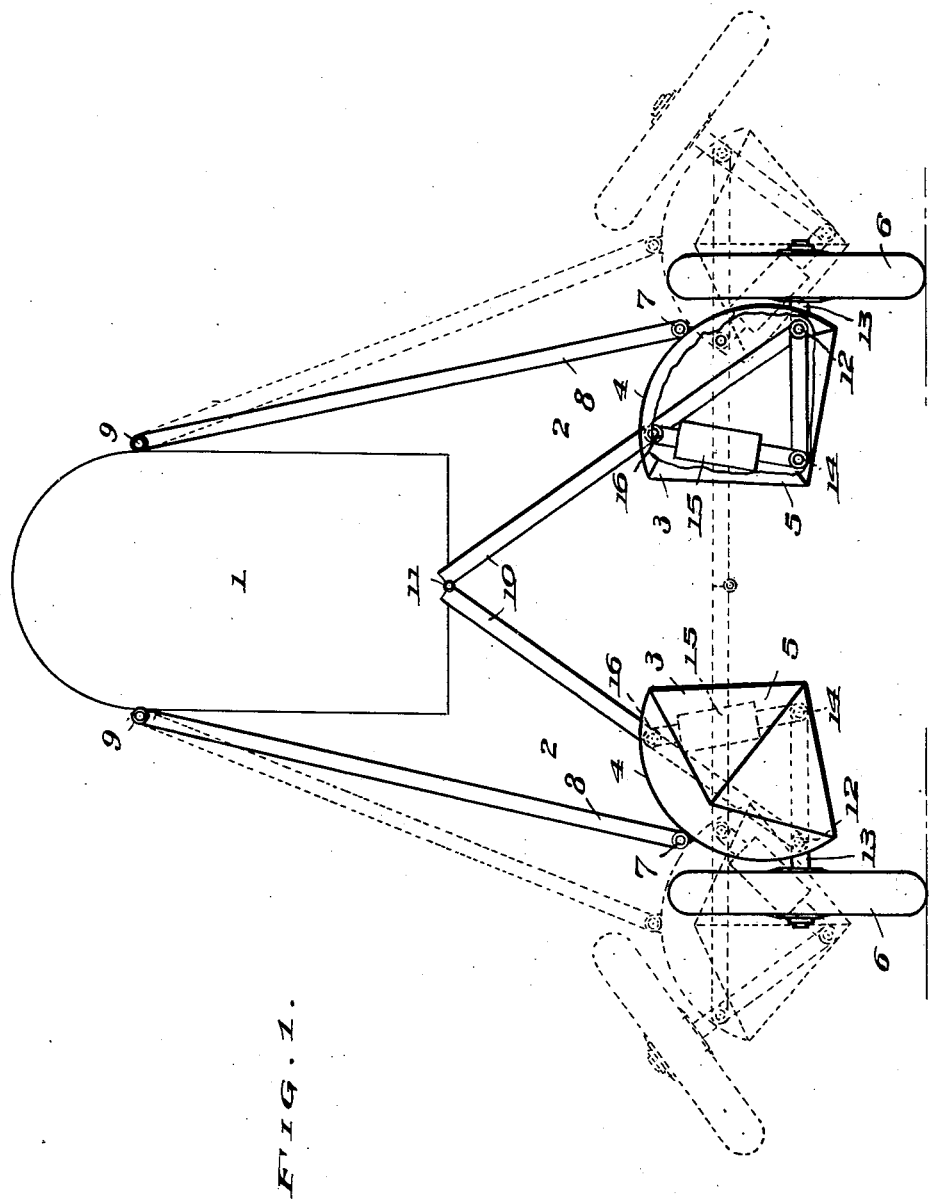
Figure 2:
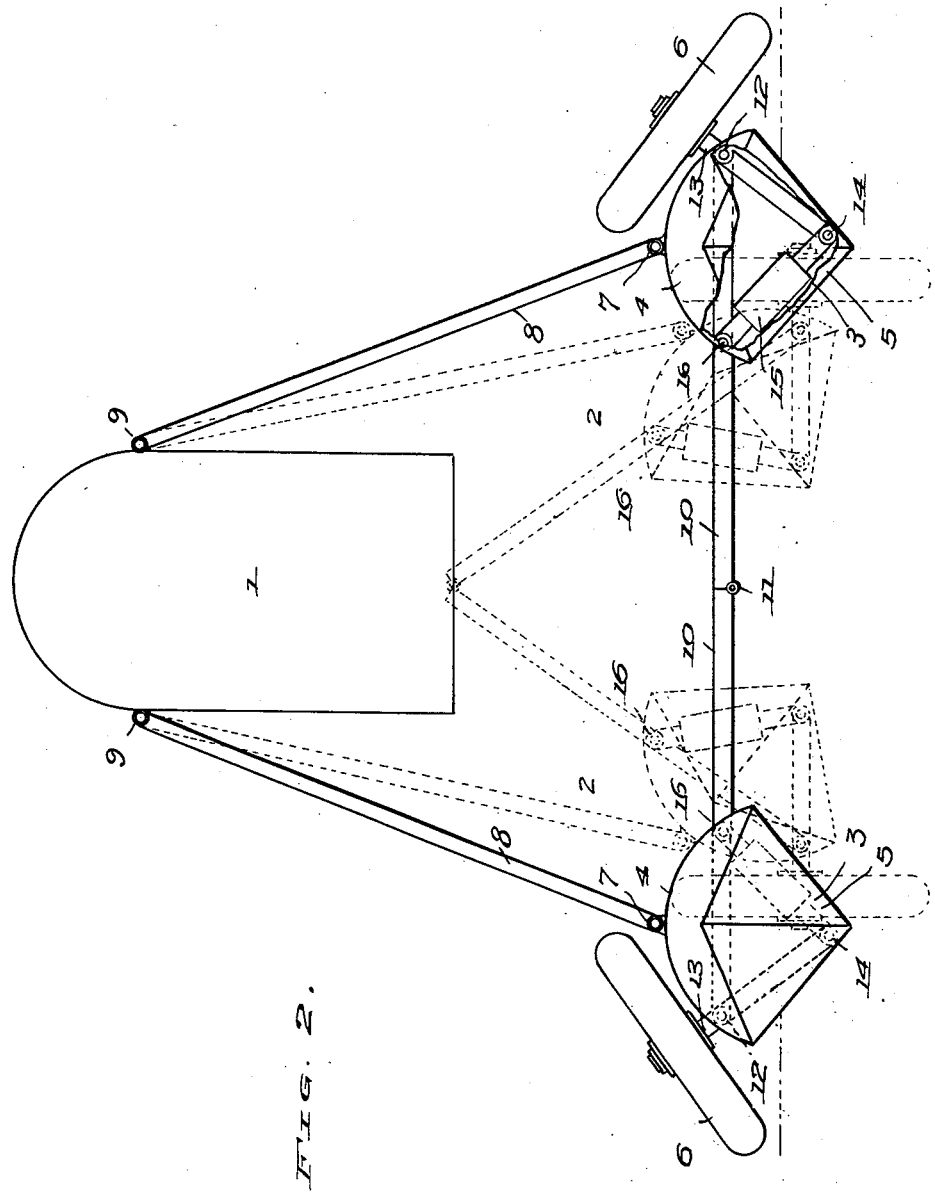

Referring to the accompanying drawings:

Figure 1 is a diagrammatic front elevation of the invention illustrating the landing wheels in operative position in full lines, and the floats in inoperative position in dotted lines; and Figure 2 is a similar view illustrating the floats in operative position in full lines, and the landing wheels in inoperative position in dotted lines.

Like numerals of reference indicate the same parts throughout the several figures, in which:

1 indicates the fuselage of an airplane of any type, and 2 indicates the landing gear, which includes the floats 3, which in the type I have illustrated embody a transversely crowned deck 4, and a V-bottom 5, and 6 indicates the landing wheels of any approved or conventional type.

Centrally of the crowned deck 4 of the float 3, I hinge at 7, the main supporting member 8 for the landing gear, which member 8 is also hingedly connected to the airplane 1, at 9, so that said member can assume the two positions shown in full and in dotted lines in the drawing.

10 indicates a combined spacer-bar and supporting member which consists of two sections hinged together at 11, the outer portions of said sections being fixed to the said floats 3. Hingedly fixed within each of the said floats at 12, and preferably to the member 10, is the wheel-axle 13, upon which the wheel 6 is mounted, said axle extending inwardly of the float 3 to a point 14 at which it is hingedly attached to a shock absorbing unit 15 also hingedly connected to the member 10 at the point 16 within the float 3.

The foregoing structure completes the assembly, though I have purposely refrained from illustrating in the drawing and describing herein any structural bracing, as obviously the character and extent of the same would depend on the size and type of the airplane, and consequently the same must be adapted to conditions as they are found to exist.

Having thus described one example of structure for carrying my inventive purpose into effect, its operation is as follows:

In order to bring the landing wheels 6 into operative position, the hinged member 10 is retracted by any suitable operating means (not shown) into its uppermost position so that the hinged ends of its two sections lie snugly against the body of the fuselage, so that the said two sections of the member 10 are rigidly supported in such extreme retracted position. This operation rotates the floats 3 on their pivotal connections 7, and carries the assembly into position shown in full lines in Figure 1, raising the floats 3 and locating the landing wheels in operative position as shown in said figure. When the gear is in this position, the sections of the member 10 act as secondary supporting members in connection with the main supporting members 8, while the said sections of the member 10 are so supported by the float structure, as not to be influenced by a bending moment at their points of connection with the shock absorbing units 15.

To position the floats 3 for use, the two sections of the member 10 are depressed into horizontal aligned position shown in full lines in Figure 2. This operatively rotates the floats 3 outwardly on their pivotal points 7 and into operative position, while carrying the landing wheels 6 up into inoperative position as shown in Figure 2. When in this position, the member 10 becomes a spacer-bar for the floats and establishes the said floats in their proper relative position. Any suitable float and skid arrangement may be employed for supporting the tail portion of the fuselage.

Having thus fully described the invention, I do not wish to be understood as limiting myself to the exact construction herein set forth, as various changes may be made therein without departing from the spirit of my invention, and I consider myself clearly entitled to all such changes and modifications as fall within the limit and scope of the appended claims.

What I claim as new and desire to secure by Letters Patent of the United States is:

1. A device of the character described including a pair of floats, a pair of landing wheels and means for locating either the floats or the wheels in operative position, said means including a main supporting member for each float hingedly secured to an airplane at its upper end, hinging means connected to the float at the lower end of the supporting member, a combined supporting and spacing member formed of two sections hingedly connected together, the outer end portion of which sections are fixed in said floats, a wheel axle pivoted in each of said floats, and a shock absorbing unit connecting each wheel axle with the adjacent section of said supporting and spacing member at a point within the space defined by the float, the whole arranged whereby movement of the said sections of the supporting and spacing member rotates the said floats and wheels on the hinged connections of said floats to selectively locate either floats or wheels in operative position.

2. A device of the character described including a pair of floats, a pair of landing wheels and means for locating either the floats or the wheels in operative position, said means including a main supporting member for each float hingedly secured to an aircraft at its upper end, hinging means connected to the float at the lower end, a combined supporting and spacing member formed of two sections hingedly connected together, the outer end portions of which sections are fixed in said floats, a wheel axle pivoted in each of said floats, and a shock absorbing unit connecting each wheel axle with the adjacent section of said supporting and spacing member, the whole arranged whereby movement of the said sections of the supporting and spacing member rotates the said floats and wheels on the hinged connections of said floats to selectively locate either floats or wheels in operative position.

3. A device of the character described including a pair of floats, a pair of landing wheels and means for locating either the floats or the wheels in operative position, said means including a main supporting member for each float secured to an aircraft at its upper end, hinging means connected to the float at the lower end of the supporting member, movable supporting and spacing means fixed in said floats, a wheel axle pivoted in each of said floats, and a shock absorbing unit connecting each wheel axle with the supporting and spacing means, the whole arranged whereby movement of the supporting and spacing means rotates the said floats and wheels on the hinged connections of said floats to selectively locate either floats or wheels in operative position.

4. A device of the character described including spaced floats, spaced landing wheels, axles therefor fixed to and movable with said floats, means for hingedly connecting said floats to an aircraft, a collapsible combined supporting and spacing member in connection with the wheel axles at points within said floats, and means for moving said floats and wheels to selectively locate either floats or wheels in operative position.

In testimony whereof I affix my signature.

THOMAS CARROLL.